US012770931B2

(12) United States Patent
Tran et al.

(10) Patent No.: US 12,770,931 B2
(45) Date of Patent: Oct. 20, 2026

(54) DYNAMIC ENERGY STORAGE SYSTEMS AND METHODS

(71) Applicant: SUPERNAL, LLC, Washington, DC (US)

(72) Inventors: Thanh Tuan Tran, Sunnyvale, CA (US); Soundararajan Manthiri, Cupertino, CA (US)

(73) Assignee: Supernal, LLC, Irvine, CA (US)

( * ) Notice: Subject to any disclaimer, the term of this patent is extended or adjusted under 35 U.S.C. 154(b) by 761 days.

(21) Appl. No.: 17/648,285

(22) Filed: Jan. 18, 2022

(65) Prior Publication Data

US 2023/0231207 A1 Jul. 20, 2023

(51) Int. Cl.

| | |
|---|---|
| ***H01M 10/42*** | (2006.01) |
| ***H01M 10/48*** | (2006.01) |
| ***H01M 50/51*** | (2021.01) |
| ***H01M 50/512*** | (2021.01) |
| *H02J 7/50* | (2026.01) |

(52) U.S. Cl.

CPC ......... *H01M 10/425* (2013.01); *H01M 10/48* (2013.01); *H01M 10/482* (2013.01); *H01M 10/486* (2013.01); *H01M 50/51* (2021.01); *H01M 50/512* (2021.01); *H01M 2010/4271* (2013.01); *H01M 2220/20* (2013.01); *H02J 7/575* (2026.01)

(58) Field of Classification Search

CPC ..... H01M 2010/4271; H01M 2220/20; H01M 10/425; H01M 10/482; H01M 10/486; H01M 10/48; H01M 50/51; H01M 50/512; H01M 10/42; H01M 10/4207; H02J 7/575; H02J 7/977; H02J 7/667; H02J 7/933; H02J 7/52; H02J 7/663; H02J 7/82; B60L 2240/545; B60L 2240/80; B60L 3/0046; B60L 58/13; B60L 58/21; B60L 58/10; Y02E 60/10

See application file for complete search history.

(56) References Cited

U.S. PATENT DOCUMENTS

| | | | | |
|---|---|---|---|---|
| 2012/0290235 | A1* | 11/2012 | Schaefer | H01M 10/48 702/63 |
| 2013/0049472 | A1 | 2/2013 | Tinglow et al. | |
| 2013/0234647 | A1 | 9/2013 | Feuerstack et al. | |
| 2017/0222276 | A1* | 8/2017 | Liu | H01M 10/482 |
| 2018/0309172 | A1* | 10/2018 | Ito | H02J 7/0063 |
| 2019/0299799 | A1* | 10/2019 | Hinterberger | B60L 50/64 |
| 2020/0144830 | A1* | 5/2020 | Muenzel | H02J 7/0016 |
| 2020/0274371 | A1* | 8/2020 | Kirleis | H01M 10/441 |
| 2023/0136580 | A1* | 5/2023 | Mondoha | B60L 58/12 429/61 |
| 2023/0387700 | A1* | 11/2023 | Singer | H01M 10/441 |

FOREIGN PATENT DOCUMENTS

| | | | | |
|---|---|---|---|---|
| CN | 107306053 B * | 6/2020 | | H01M 10/482 |
| KR | 10-2018-0063218 A | 6/2018 | | |
| KR | 10-2019-0077550 A | 7/2019 | | |
| RU | 2689401 C1 * | 5/2019 | | H01M 10/46 |

OTHER PUBLICATIONS

CN-107306053-B Translated and Original Document (Year: 2020).*
CN_107306053_B Translation (Year: 2020).*
Translated RU 2689401 (Year: 2019).*
Extended European Search Report dated Nov. 7, 2025 for corresponding European Patent Application No. 22922498.5 (17 pages).

* cited by examiner

*Primary Examiner* — Muhammad S Siddiquee
(74) *Attorney, Agent, or Firm* — Bookoff McAndrews, PLLC

(57) ABSTRACT

An energy storage system includes: a control unit; a bus; a first electrical storage unit; a second electrical storage unit; a first connection circuit configured to move between a first open position, a first closed position, and/or a first bypass position, where the first electrical storage unit is electrically connected to the bus when the first connection circuit is in the first closed position, and a second connection circuit configured to move between a second closed position, a second open position, and/or a second bypass position, where the second electrical storage unit is electrically connected to the bus when the second connection circuit is in the second closed position, where the first control unit is configured to operate to change positions of the first connection circuit and the second connection circuit.

17 Claims, 8 Drawing Sheets

DYNAMIC ENERGY STORAGE SYSTEMS AND METHODS

FIELD

The presently disclosed subject matter generally relates to dynamic energy storage for a vehicle.

BACKGROUND

Battery-powered vehicles may use an energy storage system to power, for example, one or more electric motors for propulsion of a vehicle. The vehicle may be any type of transportation, such as a car, boat, or aircraft. Some prior vehicles may have an energy storage system comprising battery cells, battery modules, or battery packs in series or parallel configurations. Prior vehicles may draw power from the energy storage system until the energy storage system is depleted or experiences a failure. In prior systems, energy storage systems may experience decreased efficiency when, for example, a battery in a battery pack experiences decreased efficiency due to overheating, cell polarization, or low voltage output. It is desirable that an energy storage system would include a capability to switch a battery experiencing decreased efficiency with a fresh battery, such as a reserve battery, and thus maintain a desired voltage output and/or avoiding overheating, cell polarization, or other battery failures.

In some prior systems, one or more batteries in a vehicle may be managed by an energy management system. In prior systems, the energy management system may engage or disengage a electrical storage unit system when appropriate for functioning of the vehicle, to supply power to one or more electric motors or to shut off when batteries are disconnected. In prior systems, the energy management system may monitor the health of the groups of batteries to determine whether the vehicle can function safely. These systems may be improved through an energy management system that, for example, may engage or disengage individual electrical storage units to satisfy a voltage requirement, to replace electrical storage unit that is experiencing decreased performance such as high temperature, low voltage, or a fault, and/or to preserve the health and capability of the batteries within the energy management system. For example, it is desirable that the energy management system might choose when to exchange an electrical storage unit with a reserve electrical storage unit based on the relative health of the electrical storage unit and the reserve electrical storage unit.

SUMMARY

Briefly described, embodiments of the presently disclosed subject matter relate to systems and methods for a dynamic energy storage system. An exemplary aspect of this disclosure relates to an energy storage system comprising a control unit; a bus; a first electrical storage unit; a second electrical storage unit; a first connection circuit configured to move between an open position and a closed position, the connection circuit configured to electrically connect the first electrical storage unit to the bus, and a first bypass position; a second connection circuit configured to move between a closed position configured to electrically connect the second electrical storage unit to the bus and a second bypass position, wherein the first control unit is configured to operate change positions of the first connection circuit and the second connection circuit.

In some embodiments, the first connection circuit may be configured to move to the bypass position when the first electrical storage unit experiences a failure and the second connection circuit is configured to move to the closed position. In some embodiments, the first connection circuit may be configured to move to the bypass position when a temperature of the first electrical storage unit is above a temperature threshold. In some embodiments, the second connection circuit may be configured to move to the closed position if a temperature of the second electrical storage unit is below a temperature threshold. In some embodiments, the first connection circuit may be configured to move to the bypass position when an output voltage of the first electrical storage unit is below a voltage threshold. In some embodiments, the voltage threshold may be determined based on a load demand from one or more electric motors electrically connected to the bus. In some embodiments, the second connection circuit may be configured to move to the closed position if the second electrical storage unit is above a temperature threshold. In some embodiments, the energy storage system may further include an electrical storage unit management system, wherein the electrical storage unit commands the circuit control unit to exchange the first electrical storage unit with the second electrical storage unit and the electrical storage unit management system records a rest timer for the first electrical storage unit when it is exchanged.

According to another aspect of the invention, an energy storage system may comprise a control unit; a bus; a first electrical storage unit; a second electrical storage unit; a first connection circuit configured to move between an open position and a closed position configured to connect the first electrical storage unit to the bus; and a second connection circuit configured to move between an open position and a closed position configured to connect the second electrical storage unit to the bus, wherein the first control unit is configured to operate the first connection circuit and the second connection circuit to change positions. In some embodiments, the first connection circuit comprises a voltage balancer. In some embodiments, the first connection circuit may be configured to move to the bypass position when the first electrical storage unit experiences a failure and the second connection circuit is configured to move to the closed position. In some embodiments, the first connection circuit may be configured to move to the closed position when the second connection circuit may move to the open position to exchange the second electrical storage unit with the first electrical storage unit, wherein the energy storage system supplies power to a load during the exchange. In some embodiments, the first connection circuit may be configured to move to the bypass position when a temperature of the first electrical storage unit is determined to be above a temperature threshold. In some embodiments, the second connection circuit may be configured to move to the closed position if a second temperature of the second electrical storage unit is below a temperature threshold. In some embodiments, the first connection circuit may be configured to move to the bypass position when an output voltage of the first electrical storage unit is determined to be below a voltage threshold. In some embodiments, the voltage threshold may be determined based on a load demand from one or more electric motors electrically connected to the bus. In some embodiments, the second connection circuit may be configured to move to the closed position if the second electrical storage unit is above a temperature threshold.

According to another aspect of the disclosure, a method of operating an energy storage system is disclosed, the method comprising determining a parameter of a first electrical storage unit in a electrical storage unit group; determining whether the parameter is less than a parameter threshold; opening a first connection circuit configured to move between a first open position and a first closed position, wherein the first closed position electrically connects the first electrical storage unit to a bus; and closing a second connection circuit configured to move between a second open position and a second closed position, wherein the second closed position electrically connects the second electrical storage unit to the bus. In some embodiments, the parameter may be based on a temperature of the first electrical storage unit, and the parameter threshold may be based on an operational temperature of the first electrical storage unit. In some embodiments, the parameter may be based on a state of charge of the first electrical storage unit, and the parameter threshold may be based on an average state of charge of the electrical storage unit group.

The foregoing summarizes only a few aspects of the presently disclosed subject matter and is not intended to reflect the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

BRIEF DESCRIPTION OF THE DRAWINGS

The accompanying drawings, which are incorporated in and constitute a part of this specification, illustrate multiple embodiments of the presently disclosed subject matter and, together with the description, serve to explain the principles of the presently disclosed subject matter; and, furthermore, are not intended in any manner to limit the scope of the presently disclosed subject matter.

It is to be understood that both the foregoing general description and the following detailed description are exemplary and explanatory only and are not restrictive of the scope of the invention.

DETAILED DESCRIPTION

Reference will now be made in detail to exemplary embodiments, some examples of which are shown in the accompanying drawings.

To facilitate an understanding of the principles and features of the invention, various illustrative embodiments are explained below. In particular, the presently disclosed subject matter is described in the context of systems and methods for an energy storage system for a vehicle. The energy storage system can include a number of electrical storage units in series or parallel. Electrical storage units can comprise one or more electrochemical systems, for example batteries, or electromechanical systems. The energy storage system can be configured to exchange a first electrical storage unit of the number of electrical storage units that is experiencing low voltage output, a failure, cell polarization, or overheating, with a second electrical storage unit. In some embodiments, the second electrical storage unit may be a reserve electrical storage unit.

Exemplary disclosed embodiments include apparatus, systems, and methods for energy storage systems.

Figure 1A:
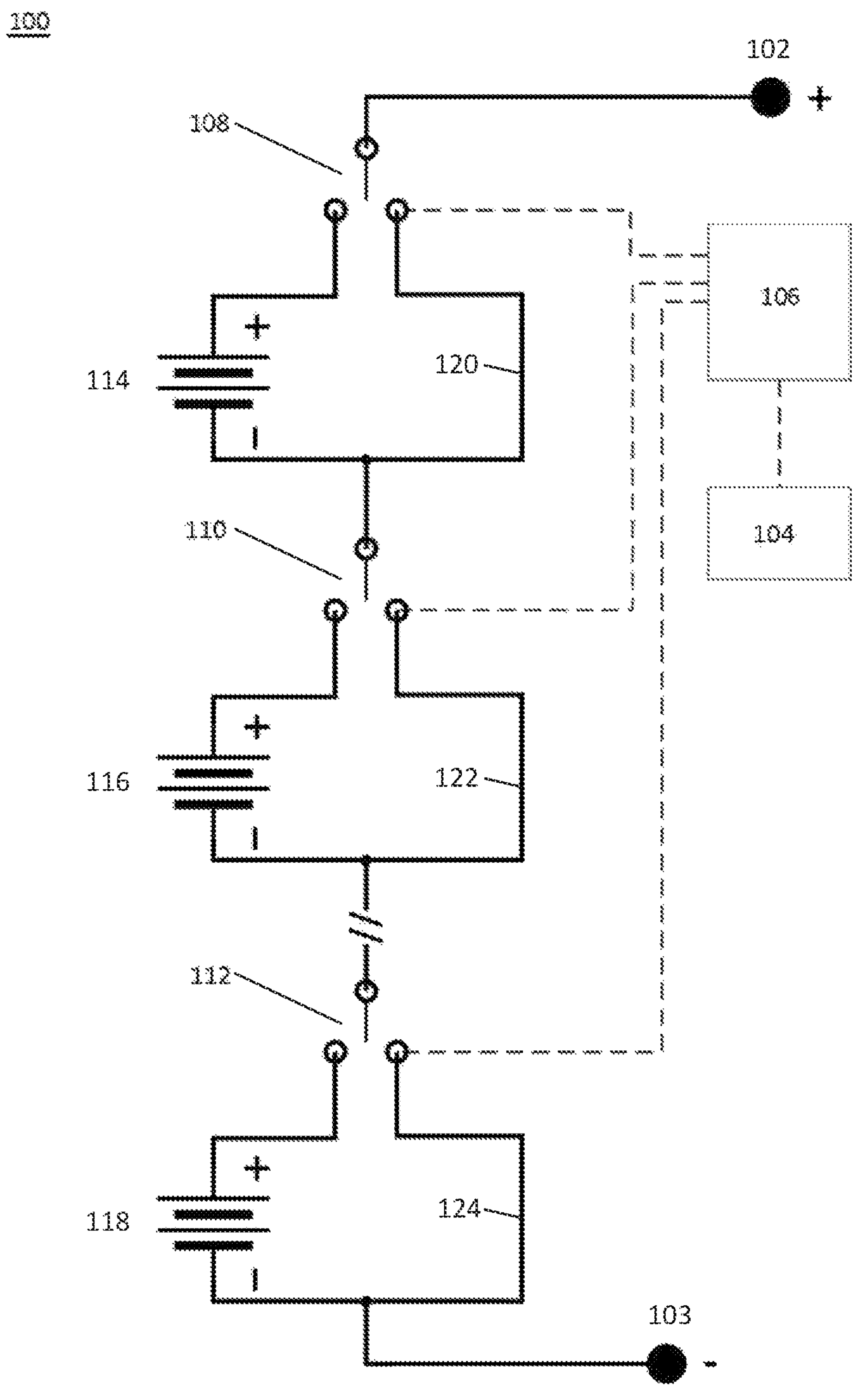
FIGS. 1A-1C illustrate system diagrams of energy storage systems according to some embodiments of the present disclosure.
Figure 1B:
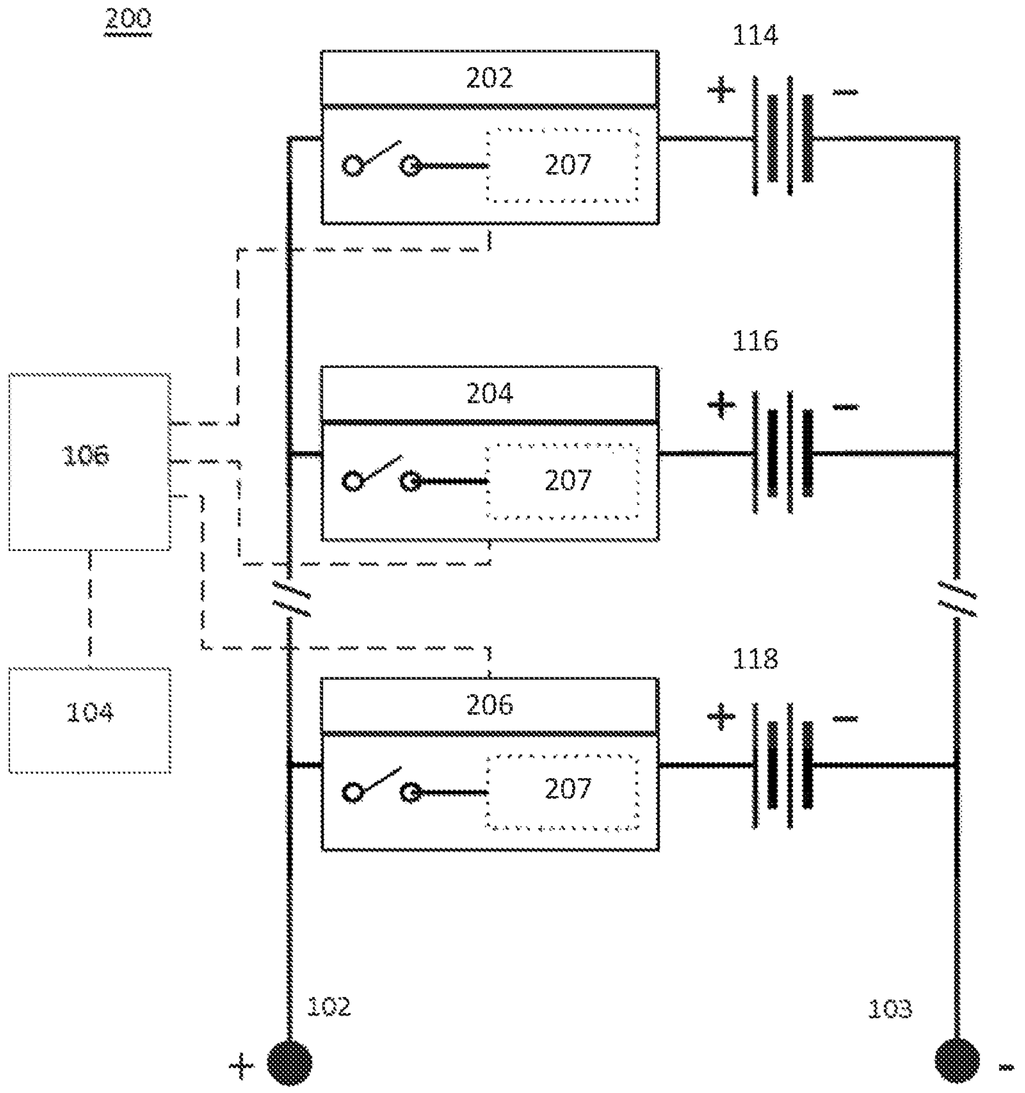
Figure 1C:
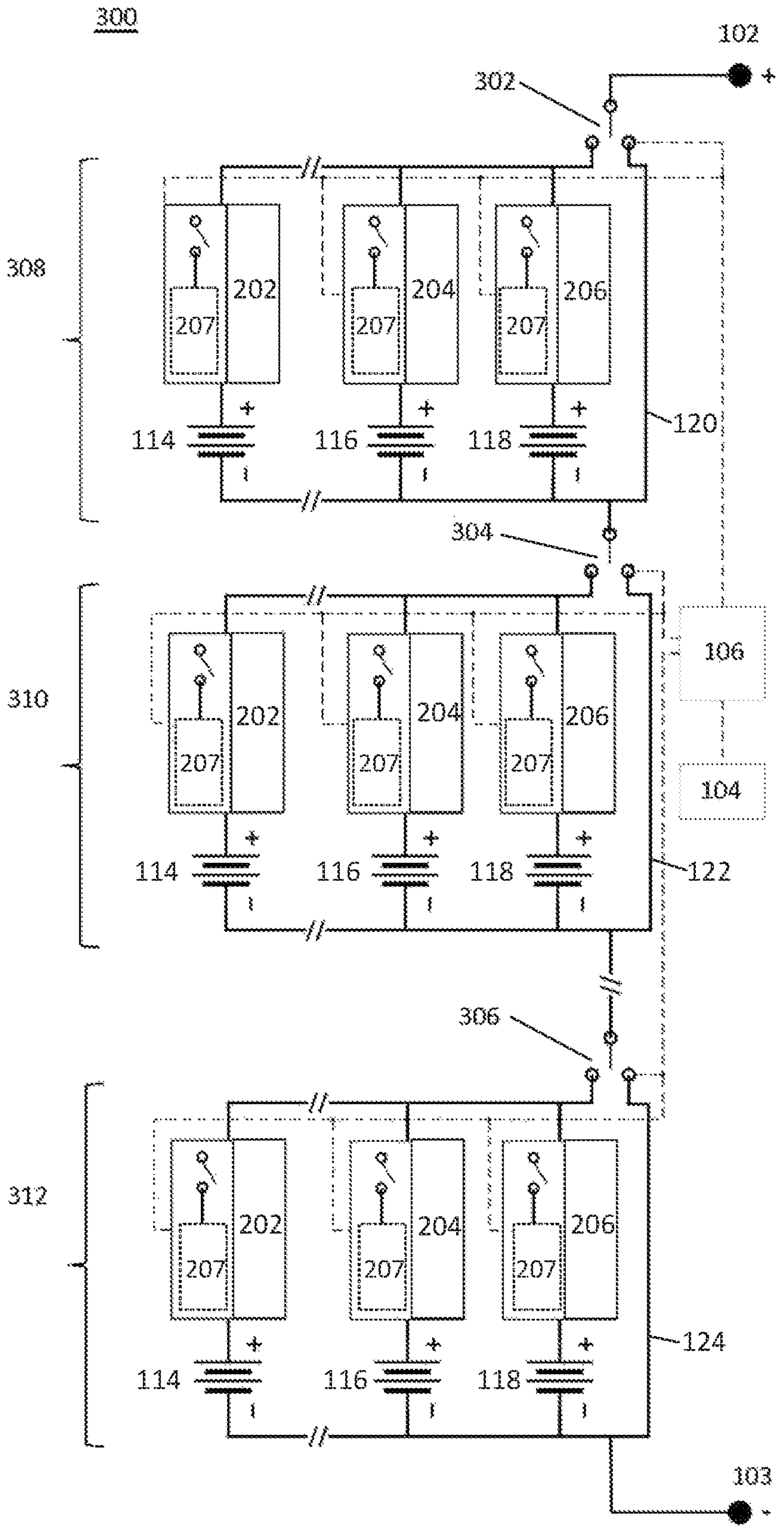

FIGS. 1A-1C illustrate non-limiting examples of energy storage systems consistent with the present disclosure. It is understood that the examples and embodiments described represent simplified descriptions used to facilitate understanding of the principles and methods of this disclosure.

FIG. 1A shows an exemplary embodiment of energy storage system (ESS) 100. ESS 100 can include bus 102. A voltage, current, and/or power flow can be evaluated at bus 102. Bus 102 may reflect a downstream usage of electrical power such as one or more electric motors. ESS 100 can include one or more electrical storage units 114, 116, 118 and one or more connection circuits 108, 110, 112. As used herein, a connection circuit refers to a contactor, semiconductor switch, DC/DC converter, inverter and/or power regulator.

ESS 100 can include circuits and components that are configured and operate to control electrical energy, for example an energy management system ("EMS") 104. EMS 104 can include one or more processors. The one or more processors of EMS 104 may operate to control the function and control of one or more electrical storage units. EMS 104 can operate to send instructions to control unit 106.

Control unit 106 may include one or more processors. Control unit 106 can be configured to operate to open and/or close one or more connection circuits (e.g., connection circuits 108, 110, 112). Control unit 106 and/or EMS 104 can communicate with each other and one or more downstream devices (e.g., connection circuits 108, 110, 112) through a controller area network ("CAN") or a data link. Control unit 106 may be configured to determine when each electrical storage unit (e.g., electrical storage units 114, 116, 118) should be connected or disconnected with the appropriate connection circuit (e.g., one or more of connection circuits 108, 110, 112). Control unit 106 may be configured to determine when an electrical storage unit (e.g., one or more of electrical storage units 114, 116, 118) is available for operation (e.g., based on state of charge, state of health, state of power, temperature). Control unit 106 can include one or more sensors associated with electrical storage units 114, 116, 118 to determine a state of the electrical storage unit. For example, the state of the electrical storage unit may be associated with a temperature, a state of health, a state of power, a voltage, or a current.

In some embodiments, EMS 104 and/or control unit 106 may be powered by a low voltage battery system associated with the vehicle. For example, the low voltage battery system may be a 12 volt system. In some embodiments, low voltage battery system can be configured to ensure operation of EMS 104 and/or control unit 106 if the high voltage system is disconnected or inoperable. In systems with a high voltage system, the high voltage system may be capable of providing power to one or more high voltage components such as, for example, electric motors associated with a vehicle.

EMS 104 may instruct control unit 106 to open (e.g., an off position) or close (e.g., an on position) connection circuits 108, 110, 112. Connection circuits 108, 110, 112, may be configured to move to a bypass position (e.g., 120, 122, 124). Bypass positions 120, 122, 124 can each be used to bypass one or more electrical storage units 114, 116, 118 while allowing remaining batteries that are connected to be connected to bus 102 and ground bus 103 (e.g., to provide power to a downstream load such as an electric motor of a vehicle). EMS 104 and/or control unit 106 may determine a number of connection circuits (e.g., connection circuits 108, 110, 112) are in a closed position to provide bus 102 with a determined voltage. In some embodiments, the determined voltage may be a minimum operating voltage for a system (e.g., the system may include one or more of onboard electronics, fault detection systems, one or more electric motors, cooling systems, etc.). For example, the minimum operating voltage for a system may change based on an operating condition associated with a vehicle (e.g., moving, stationary, off) or to operate a system (e.g., producing mechanical energy, off).

EMS 104 may receive information and/or instructions from control unit 106. For example, control unit 106 may send a status of connection circuits (e.g., connection circuits 108, 110, 112) or electrical storage unit (e.g., electrical storage units 114, 116, 118) to EMS 104. In some embodiments, control unit 106 may send instructions to EMS 104. EMS 104 may include an agency BMS module and/or an operative BMS module relative to control unit 106. For example, the agency BMS module may be configured to send control unit 106 instructions related to overall missions of a vehicle or an entire system. Missions of a vehicle may change as load conditions change and, for example, the output voltage may be set according to the load condition change. The mission may also change based on a capability of the electrical storage unit (e.g., one or more of electrical storage units 114, 116, 118). As another example, the operative BMS module may operate based on instructions received from control unit 106 related to the health or operation of one or more connection circuits (e.g., connection circuits 108, 110, 112).

ESS 100 may include a number of electrical storage units (e.g., electrical storage units 114, 116, 118) in a series as shown in FIG. 1*a*. Although three electrical storage units are shown in FIG. 1*a*, a fewer or a greater number of batteries may be used. A load may be downstream of electrical storage units 114, 116, 118, at bus 102, wherein a ground bus 103 connects to a ground or a negative connection of the load to complete the circuit with the load and allow power to flow from electrical storage units 114, 116, 118 to bus 102. Power can be allowed to flow from electrical storage units 114, 116, 118 while one electrical storage unit is exchanged for another. For example, electrical storage unit 114 can be exchanged for electrical storage unit 116 while power is being supplied from one or more electrical storage units to bus 102 by moving a connection circuit 108 from a closed circuit including electrical storage unit 114 to bypass position 120 and moving connection circuit 110 from bypass position 122 to a closed circuit position including electrical storage unit 116.

Electrical storage units 114, 116, and 118 and connecting wiring may be configured to allow for any one or all of electrical storage units 114, 116, and 118 to be removable from the system. Each electrical storage unit 114, 116, 118 may be a different type of electrochemical and/or electromechanical device. For example, one of electrical storage unit 114 may be exchanged with another electrical storage unit of a similar or different type so as to provide electrical energy by opening a contact of electrical storage unit 114 and closing the another electrical storage unit. In some embodiments, electrical storage units 114, 116, and 118 may each be a different energy storage technology (e.g., hydrogen cell, lithium ion, lead acid) reflected by different electrochemical devices. For example, electrical storage units 114, 116, and 118 can be any type of electrochemical device. In some embodiments, electrical storage units 114, 116, and 118 may each include a configuration of electrochemical devices including, for example, a battery cell, a battery pack, or a battery module, where each electromechanical device may include subcomponent electromechanical devices connected in series or parallel or a combination of series and parallel configurations.

Electrical storage units 114, 116, 118 may be charged through the ESS 100 wiring or through connections from a charger to one or more of electrical storage units 114, 116, 118.

Connection circuit 108 can electrically connect bus 102 to electrical storage unit 114. For example, connection circuit 110 may electrically connect electrical storage unit 114 to electrical storage unit 116, and/or connection circuit 112 may electrically connect electrical storage unit 116 to electrical storage unit 118. Connection circuits 108, 110, and 112 can be any type of circuit configured to connect and/or disconnect including, for example, a switch, contact, or relay or a circuit that includes one or more of a switch, a contact, and a relay. In some embodiments, connection circuits 108, 110, and 112 can include circuits such as a converter, a power regulator, a power controller, and/or an inverter. Connection circuits 108, 110, 112 may allow electricity to flow in a closed configuration and prevent the flow of electricity in an open configuration.

FIG. 1B shows an exemplary embodiment of energy storage system (ESS) 200. Certain features of ESS 200 are not discussed in these examples where such features may be similar to those discussed for other embodiments.

ESS 200 may include a number of electrical storage units (e.g., 114, 116, 118) in parallel as shown in FIG. 1B. Although three electrical storage units are shown in FIG. 1B, a fewer or a greater number of electrical storage units may be used.

ESS 200 can include connection circuits 202, 204, and 206. For example, connection circuit 202 may electrically connect Bus 102 to electrical storage unit 114, connection circuit 204 may electrically connect bus 102 to electrical storage unit 116, and/or connection circuit 206 may electrically connect bus 102 to electrical storage unit 116. Power can be allowed to flow from electrical storage units 114, 116, 118 while one electrical storage unit is exchanged for another. For example, electrical storage unit 114 can be exchanged for electrical storage unit 116 while power is being supplied by one or more electrical storage units to bus 102 by moving a connection circuit 202 from a closed circuit including electrical storage unit 114 to an open position and moving connection circuit 204 from an open position to a closed circuit including electrical storage unit 116.

Each connection circuit 202, 204, 206 each may include a V/I balancer 207. The V/I balancer 207 may be configured to modify a voltage output or a current output for each electrical storage unit (e.g., electrical storage units 114, 116, 118). The V/I balancer 207 may include one or more contacts configured to open and close. In some embodiments, V/I balancer 207 may be biased open until it receives a signal to close. In some embodiments, V/I balancer 207 may be biased closed until it receives a signal to open.

FIG. 1C shows an exemplary embodiment of energy storage system (ESS) 300. Certain features of ESS 300 are not discussed in these examples where such features may be similar to those discussed for other embodiments.

ESS 300 may include a number of electrical storage groups (e.g., 308, 310, 312) in series as shown in FIG. 1C. Although three electrical storage groups are shown in FIG. 1C, a fewer or a greater number of electrical storage groups may be used. ESS 300 may include a first type of connection circuit reflected by connection circuits 302, 304, 306 (see, e.g., connection circuits 108, 110, 112 in FIG. 1*a*), where a second type of connection circuit is used for connection circuits 202, 204, and 206 (see, e.g., FIG. 1B). Electrical storage groups 308, 310, 312 may include the same number and type of internal electrical storage units (e.g., electrical storage units 114, 116, 118), or electrical storage groups 308, 310, 312 can be different from each other, for example, each electrical storage unit including a different number of batteries or a different types of batteries. For example, electrical storage unit 308 could include one or more lithium ion batteries, and electrical storage unit 310 could include one or more hydrogen cell batteries.

Power can be allowed to flow from electrical storage groups 308, 310, 312 while one electrical storage group is exchanged for another. For example, electrical storage group 308 can be exchanged for electrical storage group 310 by moving a connection circuit 302 from a closed circuit including electrical storage group 308 to bypass 120 and moving connection circuit 304 to a closed circuit including electrical storage group 310. As discussed above with reference with FIG. 1B, connection circuits 202, 204, 206 may be opened or closed within an electrical storage group (e.g., electrical storage group 308) to exchange one electrical storage unit with another.

In some embodiments, a set of electrical storage units may be exchanged with another set of electrical storage units at the same time while power is supplied to bus 102. For example, where electrical storage group 308 includes four electrical storage units, two electrical storage units of may be exchanged with the other two electrical storage units. Power can be supplied to the bus without interruption for exchanging batteries.

In some embodiments, a reserve electrical storage unit of an electrical storage group (e.g., electrical storage group 308) may be connected to bus 102 to increase a power capacity of electrical storage group 308 when a connection circuit associated with the reserved electrical storage unit moves to a closed position.

FIGS. 2-6 illustrate non-limiting examples of methods associated with energy storage systems consistent with the present disclosure. It is understood that the examples and embodiments described represent simplified descriptions used to facilitate understanding of the principles and methods of this disclosure. One or more processors of BMS 104 and/or control unit 106 may operate to complete one or more steps disclosed in FIGS. 2-6.

Figure 2:
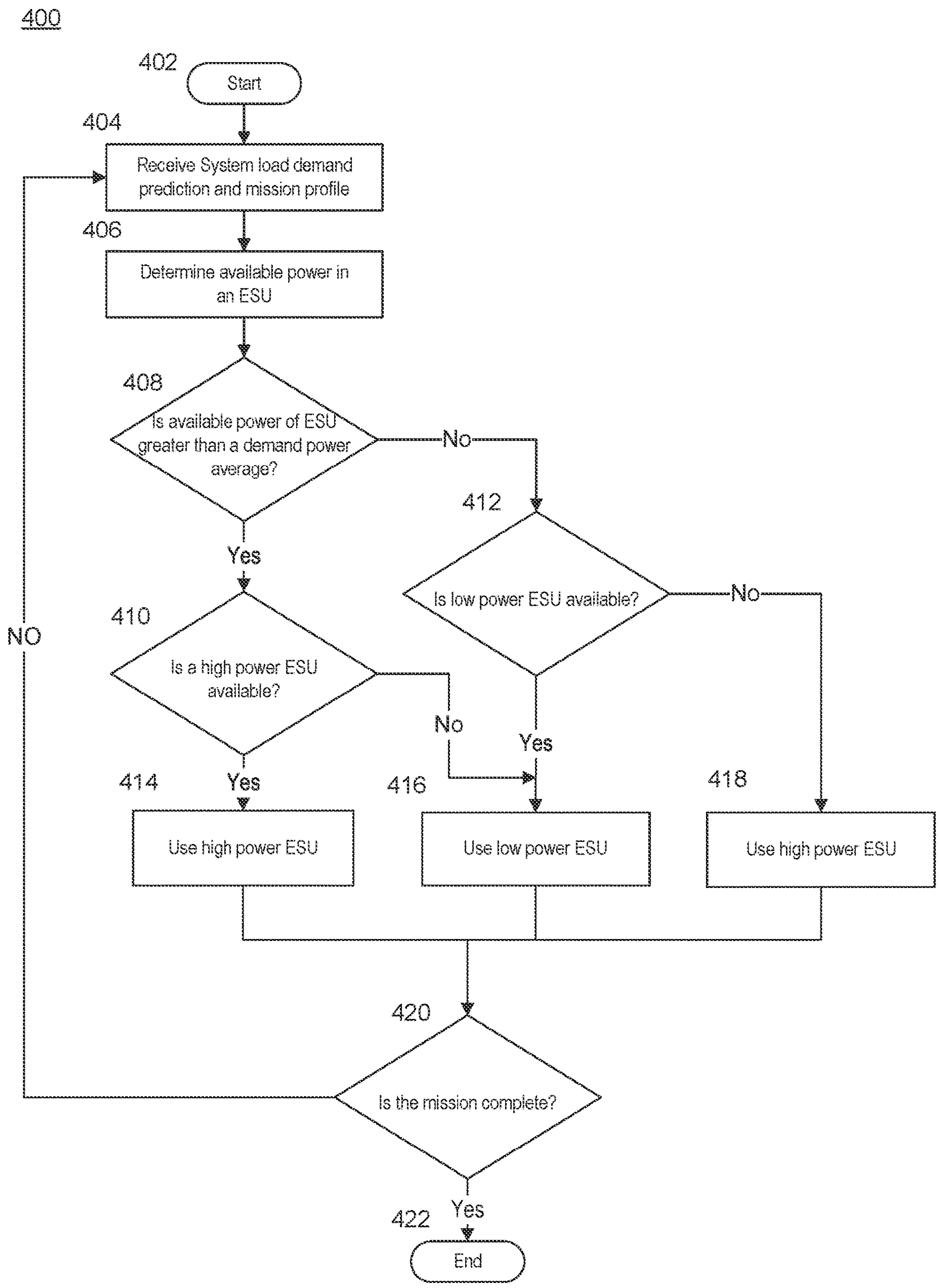
FIG. 2 illustrates a flow chart depicting an exemplary method of operating an energy management system according to some embodiments of the present disclosure.

FIG. 2 shows a flowchart of an exemplary embodiment of energy optimization method 400. Energy optimization method 400 may be configured to maintain a state of charge of an electrical storage unit group by exchange a low state of charge electrical storage unit with a high state of charge electrical storage unit. Energy optimization method 400 may be configured to exchange electrical storage units within the electrical storage unit group to meet the mission profile requirements such as a minimum peak power. Energy optimization method 400 may be configured to exchange batteries to add a low state of charge electrical storage unit for other mission profiles where a lower state of charge is desirable and/or to preserve the high state of charge electrical storage unit for mission profiles where a high state of charge is desirable. Energy optimization method 400 may be operated by a BMS (e.g., BMS 104) and/or a control unit (e.g., control unit 106).

Energy optimization method 400 can include start step 402. In some embodiments, start step 402 may include an initiation of method 400 by a BMS in response to the BMS determining that a state of charge of the energy storage system is not sufficient or not expected to be sufficient. In some embodiments, start step 402 may begin at start-up or periodically. After step 402, method 400 can proceed to step 404.

Method 400 may include a step 404 that includes receiving a system load demand prediction and mission profile. For example, the mission may be associated with providing a sufficient power to one or more electric motors of a vehicle. In some embodiments, the BMS may receive one or more parameters associated with the system load and demand prediction and mission profile, such as a required power.

Energy optimization method 400 may include a step 406 that includes checking the available power in each connected electrical storage unit and grouping the electrical storage units. Grouping the electrical storage units may occur based on high and/or low available power.

Energy optimization method 400 may include step 408 that determines whether the available power is greater than the power demand. Method 400 may progress to step 410 if available power is greater than the power demand. Method 400 may include step 410 that includes a determination of whether a high-power electrical storage unit is available. Method 400 may progress to step 412 that includes a determination of whether the available power is lower than the power demand. Method 400 may include step 412 that includes a determination if a group of lower power batteries are available.

If a group of high-power batteries are available in step 410, method 400 may progress to step 414. Method 400 may include step 414 where a group of high-power electrical storage unit is used.

If a group of lower power electrical storage units is available in step 410, method 400 may progress from step 412 to step 416. Method 400 may include step 416 that includes using the group of lower power electrical storage units. Method 400 may include step 418 that includes using high power electrical storage units if no lower power electrical storage units are available as determined in step 412.

If steps 414, 416, or 418 are reached, then method 400 may determine in step 420 whether to loop back to step 404 depending on whether a mission is complete. If the mission is not complete, step 404 may be updated with an updated mission. If the mission is complete in step 420, then the method 400 may progress to a termination step 422.

Figure 3:
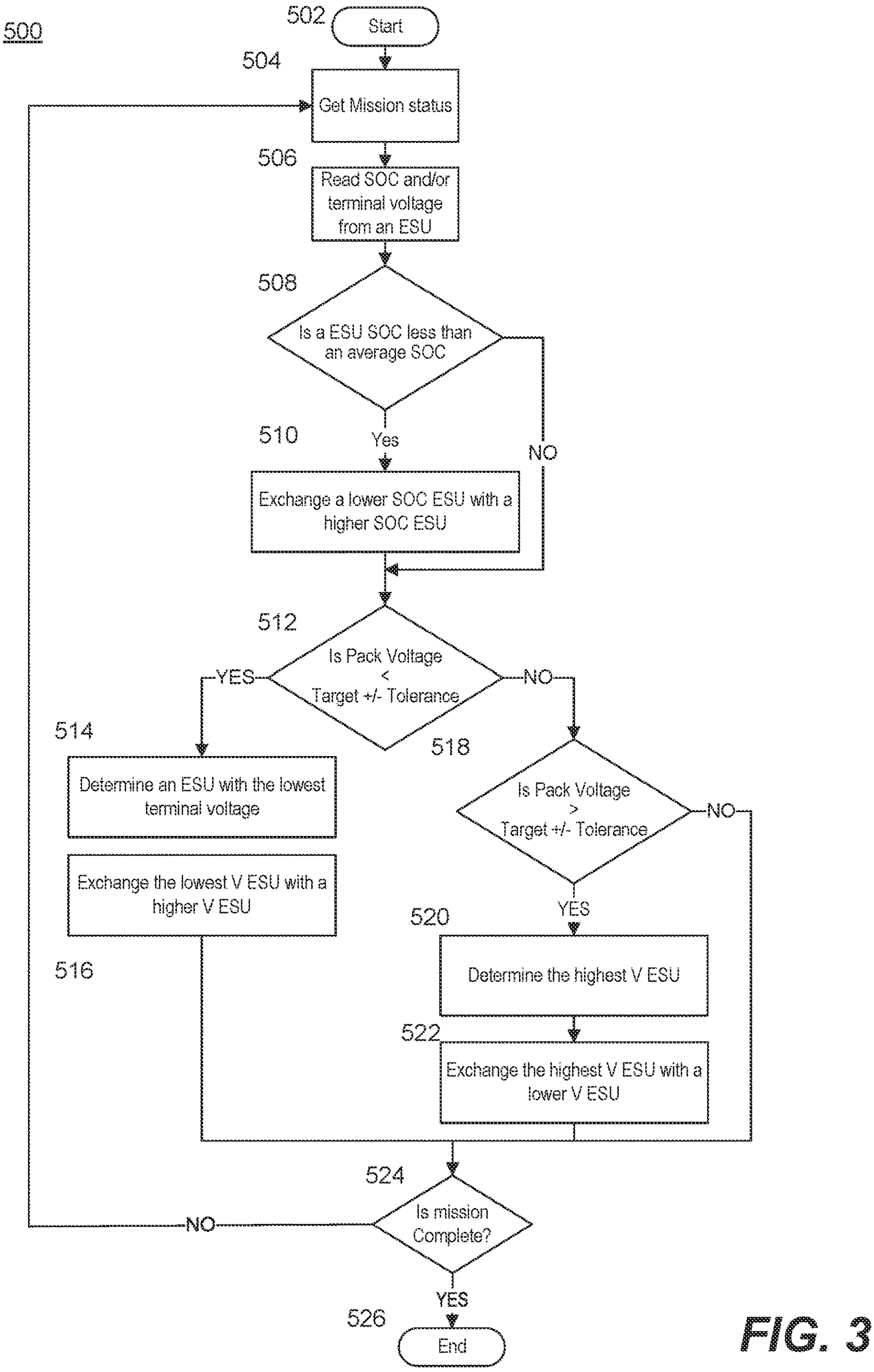
FIG. 3 illustrates a flow chart depicting an exemplary method of operating an energy management system according to some embodiments of the present disclosure.

FIG. 3 shows a flowchart of an exemplary embodiment of voltage regulation method 500. Voltage regulation method 500 may be configured to maintain a threshold voltage for a bus (e.g., bus 102) and to avoid voltage drops. For example, voltage regulation method 500 may be configured to exchange electrical storage units within a electrical storage unit group so as to maintain the threshold voltage from the electrical storage unit. The threshold voltage may be a lower limit of a voltage band, where the voltage band is determined (e.g., by a vehicle computer and/or a BMS) for a mission. Maintaining a voltage band may avoid inconsistent power to downstream components, causing failure or inefficiencies. Voltage regulation method 500 may reduce downstream voltage variability. Voltage regulation method 500 may be operated by a BMS (e.g., BMS 104) and/or a control unit (e.g., control unit 106).

Voltage regulation method 500 can include start step 502. In some embodiments, start step 502 may include an initiation of method 500 by a BMS in response to the BMS determining that a voltage output of the energy storage system is not sufficient or not expected to be sufficient. In some embodiments, start step 502 may begin at start-up and/or after a period of time has elapsed. After step 502, method 500 can proceed to step 504. Method 500 may include a step 504 that includes receiving a mission status. For example, the mission may be associated with providing a sufficient power to one or more electric motors of a vehicle or the aircraft is in standby on the ground and no power is delivered to the motors.

Voltage regulation method 500 may include a step 506 that includes reading the state of charge and/or terminal voltages from each connected electrical storage unit. Method 500 can proceed to step 508 that includes a determination of whether an electrical storage unit (e.g., electrical storage units 114, 116, 118) has a state of charge less than an average state of charge of a electrical storage unit group in a system, where the electrical storage unit group is defined as every available electrical storage unit in the system (e.g., every electrical storage unit of ESS 300). Method 500 can proceed to step 510 if a state of charge is less than the average state of charge of each electrical storage unit in the system, where step 510 may exchange one electrical storage unit (e.g., electrical storage unit 114 in FIG. 1B) with a reserve electrical storage unit (e.g., electrical storage unit 116 in FIG. 1B) by opening connection circuits associated with the one electrical storage unit (e.g., connection circuit 202 for electrical storage unit 114 as shown in FIG. 1B) and closing connection circuits associated with the reserve electrical storage unit (e.g., connection circuit 204 for electrical storage unit 116 as shown in FIG. 1B). In some embodiments, more than one electrical storage unit may be exchanged at a time if it is determined in step 508, for example, that more than one electrical storage unit has a lower state of charge than the average state of charge of any available electrical storage unit. Once an electrical storage unit is exchanged, method 500 can proceed to step 510.

In some embodiments, the electrical storage unit that is exchanged, for example in step 510, may be connection circuited to a lower load or it may be placed in reserve until a later time, for example, when the electrical storage unit is ready for service due to an elapsed resting time, a result of required maintenance being performed on the electrical storage unit, or if the electrical storage unit becomes the best available in reserve.

Method 500 can proceed to step 512 if the state of charge is more than the average state of charge of each electrical storage unit in the system. Step 512 may include a determination of whether the electrical storage unit group voltage is less than a target tolerance. The target tolerance may include a range of possible voltages. The range of possible voltages may be dependent on system requirements. If step 512 determines that the electrical storage unit group voltage is less than the target tolerance, method 500 can proceed to step 514. Step 514 may include a process to determine a lower voltage electrical storage unit in the electrical storage management group. Method 500 can proceed to step 516 where one electrical storage unit with a low voltage may be exchanged with an electrical storage unit with a high voltage, for example, by opening connection circuits associated with the lower voltage electrical storage unit (e.g., contact 202 for electrical storage unit 114 as shown in FIG. 1B) and closing connection circuits associated with the reserve electrical storage unit (e.g., connection circuit 204 for electrical storage unit 116 as shown in FIG. 1B). This step may be taken for multiple batteries identified in step 514 to achieve an output voltage that meets the target tolerance. Once the output voltage meets the target tolerance, method 500 can proceed to step 524 where it determines whether a mission is complete (e.g., whether an ESS needs to produce a desired power at the bus or not).

If step 512 determines that the pack voltage is greater than the target tolerance, then method 500 can proceed to step 518. Step 518 may include a determination whether a pack voltage is greater than the target tolerance. If not, then method 500 can proceed to step 524. If the pack voltage is greater than the target tolerance in step 518, then method 500 can proceed to step 520. Step 520 may include a determination of the highest voltage electrical storage unit in the electrical storage management group. Once the higher voltage electrical storage unit is identified, method 500 can proceed to step 522 to exchange the lower voltage electrical storage unit with the higher voltage electrical storage unit, for example, by opening connection circuits associated with the lower voltage electrical storage unit (e.g., connection circuit 202 for electrical storage unit 114 as shown in FIG. 1B) and closing connection circuits associated with the reserve electrical storage unit (e.g., connection circuit 204 for electrical storage unit 116 as shown in FIG. 1B). Once this is accomplished, method 500 can proceed to step 524 as discussed above.

If a determination that a mission is complete occurs in step 524, method 500 can proceed to step 526 to terminate method 500.

Figure 4:
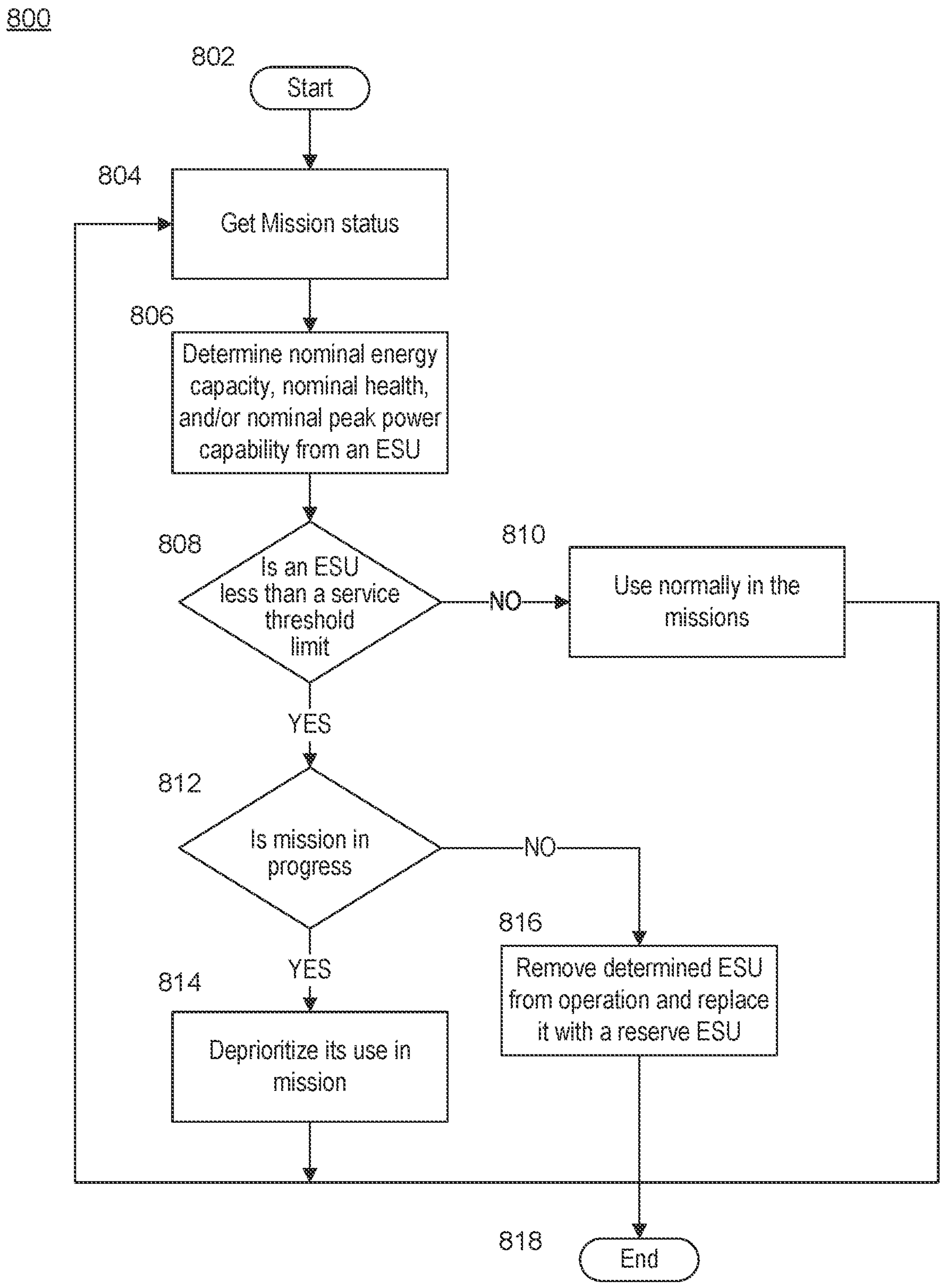
FIG. 4 illustrates a flow chart depicting an exemplary method of operating an energy management system according to some embodiments of the present disclosure.

FIG. 4 shows a flowchart of an exemplary embodiment of health optimization method 800. Health optimization method 800 may be configured to remove an electrical storage unit from service when an impedance characteristic (e.g., cycle capacity, peak power capability) of the electrical storage unit is determined to be underperforming or insufficient to meet one or more mission characteristics (e.g., required power, required voltage, required current, a threshold number of electrical storage units that are electrically connected). Electrical storage units that are determined to be underperforming may be recorded as underperforming by a BMS (e.g., BMS 104) so that the electrical storage unit of the ESS may be replaced during maintenance.

Health optimization method 800 may be operated by a BMS (e.g., BMS 104) and/or a control unit (e.g., control unit 106). Health optimization method 800 may include start step 802. In some embodiments, start step 802 may include an initiation of method 800 by a BMS in response to the BMS determining that a health of the energy storage system is not sufficient or not expected to be sufficient. In some embodiments, start step 802 may begin at start-up and/or after a period of time has elapsed. Health optimization method 800 may include a step 804 that includes receiving a mission status, consistent with the mission status discussed above with respect to FIG. 4.

Health optimization method 800 may include a step 806 that includes determining a nominal energy capacity, nominal health, and/or nominal peak power capability from an electrical storage unit in the electrical storage management group, a subset of batteries in the electrical storage unit, or every electrical storage unit in the electrical storage management group. Once step 806 is complete, method 800 can proceed to step 808. Step 808 may include a determination of whether an electrical storage unit exceeds a service threshold limit (e.g., associated with nominal energy capacity, nominal health, and/or nominal peak power capability). Nominal energy capacity, nominal health, and/or nominal peak power may be measured over time for each electrical storage unit to determine the operating parameter of each electrical storage unit such that the BMS and/or control unit may track and record nominal operating parameters for each electrical storage unit. If the electrical storage unit does not exceed the service threshold limit, then method 800 can proceed to step 810. Step 810 may include using the electrical storage unit in service. Method 800 may then proceed to terminate method 800 and/or returning to step 804 to ascertain the mission status.

If the electrical storage unit does not exceed a service threshold limit, as determined in step 808, then method 800 can proceed to step 812. Step 812 may include a step of determining whether a mission is in progress. If the mission is in progress, method 800 can proceed to step 814. Step 814 may include issuing a command to exchange the electrical storage unit that is below the service threshold limit with a reserve electrical storage unit and/or assigning a de-priority designation for the electrical storage unit that is below the service threshold limit so that it may be exchanged at a specified time (e.g., a time of low power demand or when the mission is not in progress). Method 800 may then proceed to terminate method 800 and/or returning to step 804 to ascertain the mission status.

If the mission is not in progress in step 812, method 800 can proceed to step 816. Step 816 may include an external signal (e.g., a LED) to physically replace the electrical storage unit that is below the service threshold limit with a new electrical storage unit, for example, at a maintenance depot. Method 800 can then proceed to terminate method 800.

Figure 5:
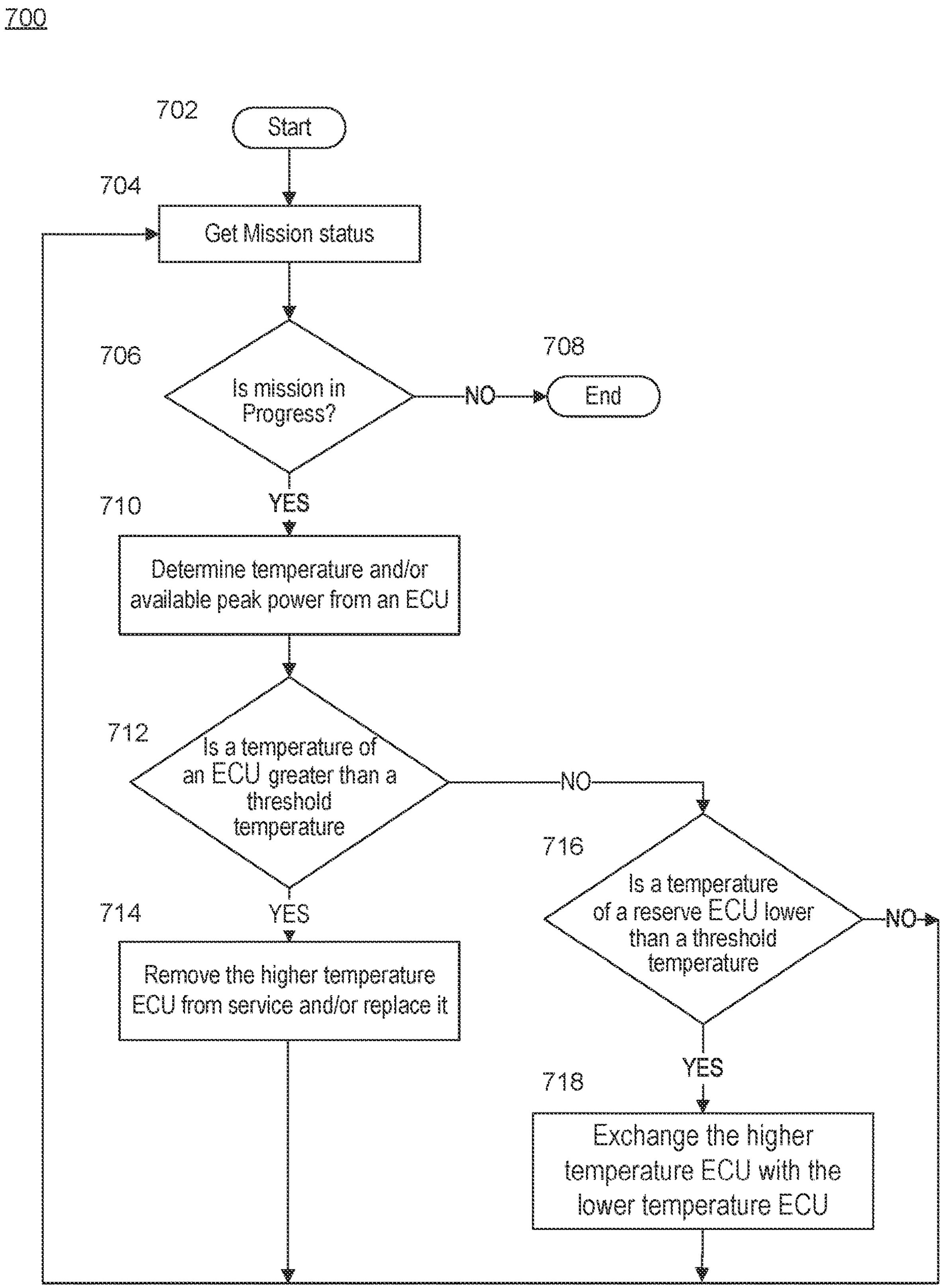
FIG. 5 illustrates a flow chart depicting an exemplary method of operating an energy management system according to some embodiments of the present disclosure.

FIG. 5 shows a flowchart of an exemplary embodiment of temperature management method 700. Temperature management method 700 may be configured to disconnect an electrical storage unit if it is higher than a high temperature threshold. The upper temperature threshold may be based on an operating temperature band of the electrical storage unit. A temperature higher than the upper temperature threshold may be associated with overheating and/or decreased efficiency. Temperature management method 700 may be configured to disconnect an electrical storage unit if it is lower than a low temperature threshold. The lower temperature threshold may be based on the operating temperature band of the electrical storage unit. A temperature lower than the lower temperature threshold may be associated with a decreased efficiency.

Temperature management method 700 may be configured to allow an electrical storage unit to cool if it overheats. Temperature management method 700 may be configured to keep each electrical storage unit of a electrical storage unit group within an operating temperature band associated with peak power and/or efficiency. Temperature management method 700 may be configured to avoid degradation of one or more electrical storage units.

Temperature management method 700 may include start step 702. In some embodiments, start step 702 may include an initiation of method 700 by a BMS in response to the BMS determining that for example, a fault exists in the energy storage system, a temperature of an electrical storage unit is not within a predefined range, or a temperature of an electrical storage unit is above or below a threshold. In some embodiments, start step 702 may begin at start-up and/or after a period of time has elapsed. Temperature management method 700 may include a step 704 that includes receiving a mission status.

Temperature management method 700 may include a step 706 that includes determining whether the mission is in progress. If no mission is in progress, then method 700 can proceed to terminate method 700 in step 708.

Temperature management method 700 can proceed to step 710 if a mission is in progress. Step 710 may include sensing a temperature of, for example, an electrical storage unit in a electrical storage unit group or every electrical storage unit in the electrical storage management group. Once step 710 is complete, method 700 can proceed to step 712. Step 712 can include a determination of whether an electrical storage unit temperature is greater than a first threshold. The first threshold may be a life retention warning threshold. If the temperature of the electrical storage unit is greater than the threshold, then method 700 can proceed to step 716 to determine if the electrical storage unit temperature is lower than a second threshold. If, in step 716, the electrical storage unit temperature is higher than the second threshold, method 700 can proceed to getting a mission status in step 704.

If, in step 712, the electrical storage unit temperature is less than the first threshold, method 700 can proceed to step 714. Step 714 may include a step of exchanging the electrical storage unit with the temperature greater than the first threshold with a replacement electrical storage unit (e.g., a cooler electrical storage unit) by opening connection circuits associated with the higher temperature electrical storage unit (e.g., connection circuit 202 for electrical storage unit 114 as shown in FIG. 1B) and closing connection circuits associated with the reserve electrical storage unit (e.g., connection circuit 204 for electrical storage unit 116 as shown in FIG. 1B).

If, in step 716, if a reserve electrical storage unit temperature is less than the second threshold, then method 700 can proceed to step 718. Step 718 may include a step of exchanging the reserve electrical storage unit temperature with the electrical storage unit (e.g., an in-service electrical storage unit) by opening connection circuits associated with the higher temperature management unit (e.g., connection circuit 202 for electrical storage unit 114 as shown in FIG. 1B) and closing connection circuits associated with the reserve electrical storage unit (e.g., connection circuit 204 for electrical storage unit 116 as shown in FIG. 1B).

Figure 6:
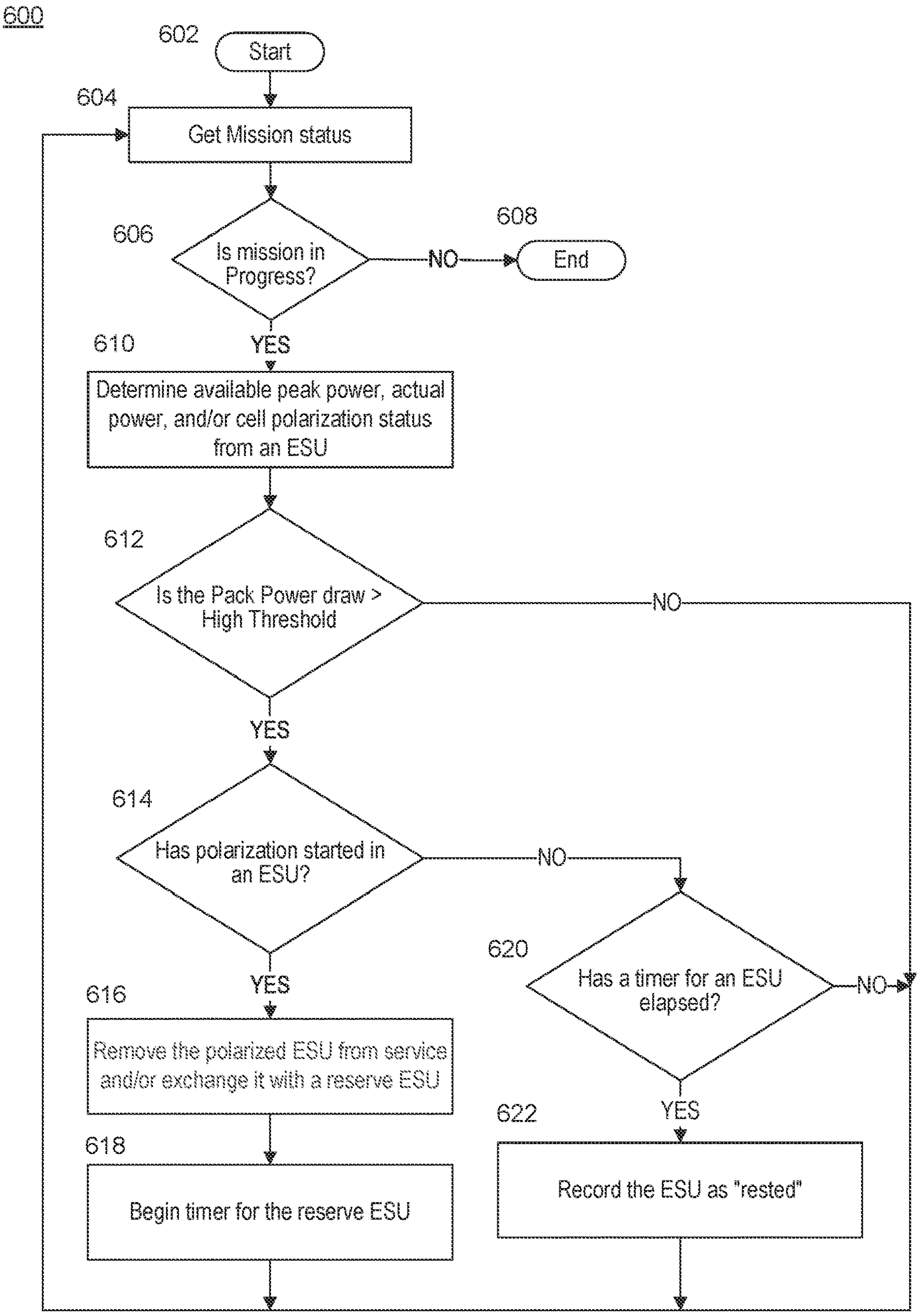
FIG. 6 illustrates a flow chart depicting an exemplary method of operating an energy management system according to some embodiments of the present disclosure.

FIG. 6 shows a flowchart of an exemplary embodiment of duty cycle adjustment method 600. Duty cycle adjustment method 600 method may be configured to disconnect an electrical storage unit so that it may recover a power capability (e.g., so that it may produce a larger peak power). Duty cycle adjustment method 600 may be configured to manage a rest timer for the electrical storage unit to ensure that the electrical storage unit has time to recover. Duty cycle adjustment method 600 may be configured to disconnect an electrical storage unit that passes a polarization threshold. Duty cycle adjustment method 600 may include start step 602. In some embodiments, start step 602 may include an initiation of method 600 by a BMS in response to the BMS determining, for example, that a fault exists in the energy storage system, a low available peak power from connected electrical storage units, or a cell polarization alert from one or more electrical storage units. In some embodiments, start step 602 may begin at start-up and/or after a period of time has elapsed. Duty cycle adjustment method 600 may include a step 604 that includes receiving a mission status.

Duty cycle adjustment method 600 may be operated by a BMS (e.g., BMS 104) and/or a control unit (e.g., control unit 106). Duty cycle adjustment method 600 may include a step 606 that includes determining whether the mission is in progress. If no mission is in progress, then method 600 can proceed to terminate method 600 in step 608.

Duty cycle adjustment method 600 can proceed to step 610 if a mission is in progress. Step 610 may include determining a peak power, actual power, and/or cell polarization status from an electrical storage unit in an electrical storage management group, a subset of batteries in an electrical storage unit, or every electrical storage unit in an electrical storage management group. Once step 610 is complete, method 600 can proceed to step 612. Step 612 may include a determination of whether a electrical storage unit group power draw is greater than a threshold. The threshold can be a life optimization threshold. The electrical storage unit group power draw may be associated with an output power (e.g., bus 102). If the electrical storage unit group draw is greater than the threshold, then method 600 can proceed to step 604 to determine the mission status.

If the electrical storage unit group power draw is less than the threshold, then method 600 can proceed to step 614. Step 614 may include a determination of whether polarization has started in any electrical storage unit. If not, method 600 can proceed to step 620 where a determination is made of whether a rest timer for an electrical storage unit has elapsed. If a rest timer has not elapsed in step 620, method 600 can proceed to step 604. If a rest timer has elapsed in step 620, method 600 can proceed to step 622 to generate an indicator that the rest timer has elapsed (e.g., the electrical storage unit may be associated with a "rested" indicator").

If polarization has started in any electrical storage unit in step 614, then method 600 can proceed to step 616. Step 616 may include exchanging the electrical storage unit where polarization has started from an active state by exchange the electrical storage unit where polarization has started (e.g., connection circuit 202 for electrical storage unit 114 as shown in FIG. 1B) and closing connection circuits associated with the reserve electrical storage unit where polarization has not started (e.g., connection circuit 204 for electrical storage unit 116 as shown in FIG. 1B). Method 600 may include step 618 after step 616, where step 618 includes setting a rest timer for an electrical storage unit removed due to a determination in step 614 that polarization has started. After step 618, method 600 can proceed to step 604.

The methods disclosed and discussed above with reference to FIGS. 2-6 may be implemented in part or in full on various processors, belonging to one or more of a BMS, a contact control unit, an energy management system, or a processor associated with a vehicle's operation. Although the flow charts discussed with reference to FIGS. 2-6 reference electrical storage units, the flow charts could also be used with reference to electrical storage unit groups as discussed with respect to FIG. 1C or, in some embodiments, individual batteries.

Certain features which, for clarity, may also be provided in combination in a single embodiment. Conversely, various features, which for brevity, are described in the context of a single embodiment, may also be provided in multiple embodiments separately or in any suitable sub-combination. Moreover, although features may be described above as acting in certain combinations and even initially claimed as such, one or more features or steps from a claimed combination can in some cases be excised from the combination, and the claimed combination may be directed to a subcombination or variation of a subcombination.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. In particular, aspects of the present disclosure have been described as relating to systems and methods for providing a dynamic energy storage system. Additionally, other equivalent methods or composition to these described aspects are also contemplated by the teachings herein. Therefore, the present disclosure should not be limited to any single aspect, but rather construed in breadth and scope in accordance with the appended claims.

What is claimed is:

1. An energy storage system comprising:

a control unit;

a bus;

a first electrical storage unit;

a second electrical storage unit;

a first connection circuit configured to move between a first closed position to electrically connect to the first electrical storage unit, and a first bypass position where the first connection circuit is electrically connected to a first bypass line and the first electrical storage unit is not electrically connected to the first connection circuit; and a second connection circuit configured to move between a second closed position to electrically connect to the second electrical storage unit, and a second bypass position where the second connection circuit is electrically connected to a second bypass line and the second electrical storage unit is not electrically connected to the second connection circuit, wherein the first bypass line, the second bypass line, and bus are separate lines, wherein the control unit is configured to switch the first connection circuit to the first bypass position, in response to the control unit detecting that both of the first and second electrical storage units are in a fault state in which a parameter of each of the electrical storage units exceeds a parameter threshold, while the first electrical storage unit exceeds its parameter threshold to a greater extent that the second electrical storage unit exceeds its parameter threshold.

2. The energy storage system of claim 1, wherein the parameter is temperature, and the parameter threshold is a temperature threshold.

3. The energy storage system of claim 1, wherein the parameter is temperature and the parameter threshold is a temperature threshold, such that the control unit is configured to switch the first connection circuit to the first bypass position, in response to the control unit detecting that temperatures of each of the first and second electrical storage unit exceeds its temperature threshold, while the first electrical storage unit exceeds its temperature threshold to a greater extent that the second electrical storage unit exceeds its temperature threshold.

4. The energy storage system of claim 1, further comprising a third electrical storage unit configured to supply power to the bus during the switching of the first connection circuit to the first bypass position and the second connection circuit to the second closed position.

5. The energy storage system of claim 4, wherein the control unit is further configured, during the switching of the first connection circuit to the first bypass position, to provide power to the bus with the third electrical storage unit, until the parameter of at least one of the first or second electrical storage units is below its parameter threshold.

6. The energy storage system of claim 5, wherein the parameter is temperature, and the parameter threshold is a temperature threshold.

7. The energy storage system of claim 6, wherein the control unit is further configured, during the switching of the first connection circuit to the first bypass position, both (i) to switch the second connection circuit such that the second connection circuit remains in the second bypass position, and (ii) to provide power to the bus with the third electrical storage unit, until the parameter of at least one of the first or second electrical storage units is below its parameter threshold.

8. The energy storage system of claim 1 further comprising an electrical storage unit management system, wherein the electrical storage unit management system is configured to command the control unit to switch the first connection circuit and the second connection circuit, and the electrical storage unit management system is configured to monitor a rest timer for the first electrical storage unit after the switching.

9. The energy storage system of claim 1, wherein the first electrical storage unit and the second electrical storage unit are in series with one another.

10. The energy storage system of claim 1, wherein the first electrical storage unit and the second electrical storage unit are in parallel with one another.

11. An energy storage system comprising:

a control unit;

a first electrical storage unit;

a second electrical storage unit;

a first connection circuit configured to move between a first closed position and a first bypass position, wherein in the first closed position the first connection circuit is connected to the first electrical storage unit and disconnected from a first bypass line, wherein in the first bypass position the first connection circuit is disconnected from the first electrical storage unit and connected to the first bypass line; and a second connection circuit configured to move between a second closed position and a second bypass position, wherein in the second closed position the second connection circuit is connected to the second electrical storage unit and disconnected from a second bypass line, wherein in the second bypass position the second connection circuit is disconnected from the second electrical storage unit and connected to the second bypass line, wherein the control unit is configured to both (i) switch the first connection circuit to the first bypass position, and (ii) switch the second connection circuit to the second closed position, in response to the first and second electrical storage units having temperatures outside of predetermined temperature ranges and the first electrical storage unit exceeding its predetermined temperature range to an extent greater than the second electrical storage unit exceeds its predetermined temperature range.

12. The energy storage system of claim 11, wherein the first electrical storage unit and the second electrical storage unit are in series with one another.

13. The energy storage system of claim 11, wherein the first electrical storage unit and the second electrical storage unit are in parallel with one another.

14. The energy storage system of claim 11, wherein the control unit is further configured to both (i) switch the first connection circuit to the first closed position, and (ii) switch the second connection circuit to the second bypass position, in response to determining that the first electrical storage unit exceeds its predetermined temperature range to a lesser extent than the second electrical storage unit exceeds its predetermined temperature range.

15. The energy storage system of claim 11, further comprising a bus, and a third electrical storage unit, wherein the third electrical storage unit is configured to supply power to the bus during the switching.

16. The energy storage system of claim 15, wherein the control unit is further configured to both (i) switch the first connection circuit to the first bypass position, such that the first and second connection circuits are in the first and second bypass positions, and (ii) provide power to the bus with the third electrical storage unit, until the temperature of at least one of the first or second electrical storage units is within its predetermined temperature range.

17. The energy storage system of claim 16, wherein the control unit is further configured to stop providing power to the bus with the third electrical storage unit when the temperature of at least one of the first or second electrical storage units is within its predetermined temperature range.

* * * * *